United States Patent
Van Pelt et al.

(10) Patent No.: US 10,692,541 B2
(45) Date of Patent: Jun. 23, 2020

(54) CARRIERLESS DRIVE INSERTION, RETENTION AND REMOVAL SYSTEM

(71) Applicant: Seagate Technology LLC, Cupertino, CA (US)

(72) Inventors: Kevin Van Pelt, Longmont, CO (US); Charlie Morris, Longmont, CO (US); Odie Killen, Monument, CO (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 16/441,884

(22) Filed: Jun. 14, 2019

(65) Prior Publication Data

US 2020/0027485 A1 Jan. 23, 2020

Related U.S. Application Data

(60) Provisional application No. 62/684,933, filed on Jun. 14, 2018.

(51) Int. Cl.
*G11B 33/12* (2006.01)

(52) U.S. Cl.
CPC ............................ *G11B 33/128* (2013.01)

(58) Field of Classification Search
CPC ........ H02G 11/003; H02G 3/386; H01B 7/08; H01B 7/0823; H01B 7/0838;
(Continued)

(56) References Cited

U.S. PATENT DOCUMENTS 3,900,170 A * 8/1975 Serizawa ......... G11B 15/67565
242/338
4,484,240 A * 11/1984 Yoshida ........... G11B 15/67565
360/96.51
(Continued)

FOREIGN PATENT DOCUMENTS

JP 2000173139 A * 6/2000

OTHER PUBLICATIONS https://code.facebook.com/posts/1869788206569924/introducing-bryce-canyon-our-next-generation-storage-platform/ , (6 pages).
(Continued)

*Primary Examiner* — Binh B Tran
*Assistant Examiner* — Krystal Robinson
(74) *Attorney, Agent, or Firm* — Westman, Champlin & Koehler, P.A.

(57) ABSTRACT

An apparatus includes a guide system having first and second opposing guide walls with guide features extending from the first and second guide walls. The guide features support a data storage device when the data storage device is positioned between the first and the second opposing guide walls. The apparatus also includes a slidable member operably coupled to the first guide wall. The slidable member includes a top portion having retention features and a bottom portion having a lifting member. The lifting member enables lifting of the data storage device by the slidable member when the data storage device is within the guide system. The slidable member further includes a bent latch-release portion between the top portion and the bottom portion. The bent latch-release portion biases the data storage device towards the second guide wall.

20 Claims, 12 Drawing Sheets

(58) Field of Classification Search
CPC .. H01B 7/0861; H01B 7/0869; H01B 7/0892; H01B 9/003; H01L 21/67086; H01L 21/67718; H01L 21/67742; H01L 21/67751; H01L 21/68707; H01L 21/68721; H01L 31/02; H01L 31/048; H01L 31/049; H02B 1/46

See application file for complete search history.

(56) References Cited

U.S. PATENT DOCUMENTS

| | | | |
|---|---|---|---|
| 4,782,407 A * | 11/1988 | Hwang | G11B 15/67547 360/85 |
| 5,103,357 A * | 4/1992 | Nakanishi | G11B 15/67547 360/96.51 |
| 5,408,370 A * | 4/1995 | Shiokawa | G11B 15/61 360/85 |
| 5,408,371 A * | 4/1995 | Scholz | G11B 15/10 360/96.51 |
| 5,452,154 A * | 9/1995 | Asakura | G11B 15/67549 360/85 |
| 6,014,358 A * | 1/2000 | Kabasawa | G11B 17/0438 720/635 |
| 6,487,071 B1 | 11/2002 | Tata et al. | |
| 7,126,817 B2 * | 10/2006 | Li | G06F 1/184 361/679.37 |
| 7,298,624 B2 | 11/2007 | Boswell et al. | |
| 7,440,271 B2 * | 10/2008 | Chen | G06F 1/187 211/193 |
| 7,483,268 B1 | 1/2009 | King, Jr. et al. | |
| 7,684,182 B2 * | 3/2010 | Zhang | G11B 33/123 16/258 |
| 8,215,727 B2 | 7/2012 | Barrall et al. | |
| 8,456,832 B1 * | 6/2013 | Brigham, Jr. | G06F 1/187 361/679.33 |
| 8,576,558 B2 * | 11/2013 | Chen | G06F 1/187 361/679.31 |
| 8,991,950 B2 | 3/2015 | Privitera et al. | |
| 9,042,094 B2 | 5/2015 | Williams et al. | |
| 9,389,651 B2 | 7/2016 | Brockett et al. | |
| 9,564,178 B2 | 2/2017 | Kay | |
| 9,607,660 B2 | 3/2017 | Bennett, II et al. | |
| 9,690,335 B2 | 6/2017 | Adrian | |
| 9,691,435 B2 | 6/2017 | Ehlen | |
| 9,763,350 B2 | 9/2017 | Rust et al. | |
| 9,826,657 B2 | 11/2017 | Killen et al. | |
| 9,851,765 B1 | 12/2017 | Schroeder et al. | |
| 9,857,851 B1 | 1/2018 | Van Pelt et al. | |
| 9,888,607 B2 | 2/2018 | Van Pelt et al. | |
| 9,958,912 B2 * | 5/2018 | Chen | G06F 1/187 |
| 10,111,365 B1 * | 10/2018 | Junkins | H05K 7/1487 |
| 10,168,747 B2 * | 1/2019 | Zhu | G06F 1/187 |
| 10,228,734 B1 * | 3/2019 | Hsieh | G11B 33/124 |
| 10,354,697 B1 * | 7/2019 | Zhang | H05K 5/023 |
| 10,512,189 B1 * | 12/2019 | Ni | H05K 7/1489 |
| 10,539,985 B2 * | 1/2020 | Beall | H05K 7/20736 |
| 10,595,443 B2 * | 3/2020 | Chang | H05K 7/18 |
| 2006/0198043 A1 * | 9/2006 | Asai | G11B 15/67547 360/96.61 |
| 2007/0030639 A1 * | 2/2007 | Ko | G11B 33/1493 361/679.34 |
| 2007/0211423 A1 | 9/2007 | Huang et al. | |
| 2008/0135503 A1 * | 6/2008 | Hidaka | H05K 7/1448 211/26 |
| 2008/0164789 A1 * | 7/2008 | Williams | F16L 3/00 312/223.1 |
| 2008/0191590 A1 * | 8/2008 | Lin | G11B 33/128 312/223.2 |
| 2009/0059507 A1 * | 3/2009 | Peng | G11B 33/124 361/679.33 |
| 2009/0103252 A1 * | 4/2009 | Peng | G11B 33/124 361/679.4 |
| 2009/0129009 A1 * | 5/2009 | Zhang | G11B 33/121 361/679.34 |
| 2009/0260874 A1 * | 10/2009 | Eckberg | H05K 7/1491 174/650 |
| 2011/0100668 A1 * | 5/2011 | Syed | G06F 1/18 174/50 |
| 2011/0173805 A1 | 7/2011 | Richet et al. | |
| 2013/0201626 A1 | 8/2013 | Bondurant et al. | |
| 2014/0199141 A1 * | 7/2014 | Bolde | B66F 9/141 414/286 |
| 2014/0362515 A1 * | 12/2014 | Pronozuk | H05K 7/1487 361/679.31 |
| 2015/0077921 A1 * | 3/2015 | Tsai | H01R 4/66 361/679.33 |
| 2015/0109726 A1 * | 4/2015 | Li | F16B 21/08 361/679.33 |
| 2016/0217097 A1 * | 7/2016 | Gomez | G06F 13/4068 |
| 2016/0309612 A1 * | 10/2016 | Yi | H02G 3/0456 |
| 2017/0047772 A1 * | 2/2017 | Wang | H05K 7/1492 |
| 2019/0037713 A1 * | 1/2019 | Zhai | H05K 5/0221 |

OTHER PUBLICATIONS

Adrian, Jason et al., Bryce Canyon Storage System Specification 0.7, Jan. 31, 2017, 161 pages.

* cited by examiner

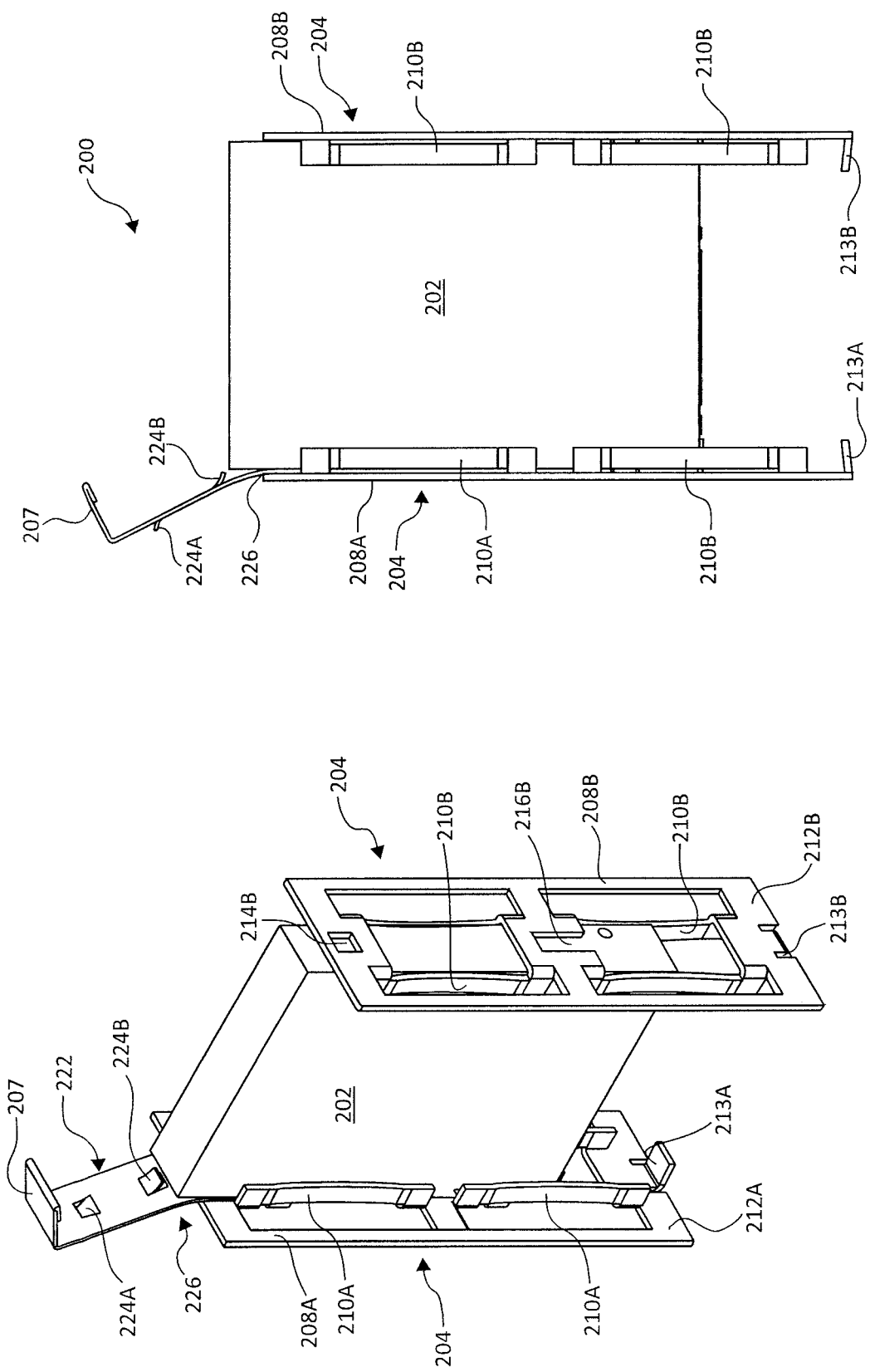

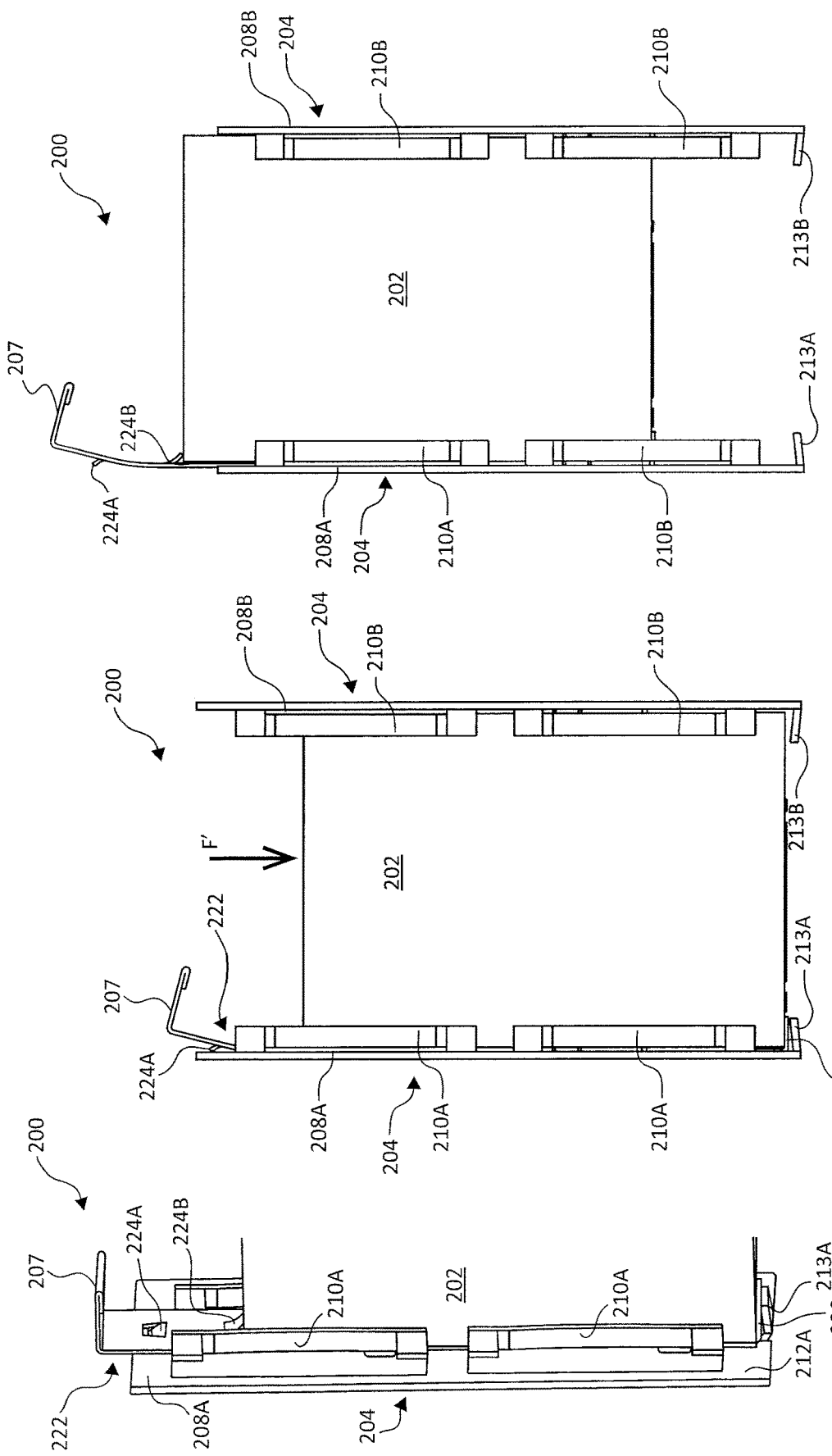

CARRIERLESS DRIVE INSERTION, RETENTION AND REMOVAL SYSTEM

CROSS-REFERENCE TO RELATED APPLICATIONS

This application is a non-provisional application of U.S. Provisional Application No. 62/684,933, filed on Jun. 14, 2018, the content of which is hereby incorporated in its entirety.

SUMMARY

In one embodiment, a data storage device insertion, retention and removal system is provided. The system includes a guide system including first and second opposing guide walls with guide features extending from the first and second guide walls. The guide features support a data storage device when the data storage device is positioned between the first and the second opposing guide walls. The system also includes a slidable member operably coupled to the first guide wall or the second guide wall. The slidable member includes a bottom portion that has a lifting member that enables lifting of the data storage device by the slidable member when the data storage device is within the guide system. The slidable member also includes a top portion having opposing clip features. A first one of the opposing clip features latches the slidable member into the first guide wall or the second glide wall when the data storage device insertion, retention and removal system is in a closed position. A second one of the opposing clip features captures the data storage device vertically within the guide system.

In another embodiment, an apparatus is provided. The apparatus includes a guide system having first and second opposing guide walls with guide features extending from the first and second guide walls. The guide features support a data storage device when the data storage device is positioned between the first and the second opposing guide walls. The apparatus also includes a slidable member operably coupled to the first guide wall. The slidable member includes a top portion having retention features and a bottom portion having a lifting member. The lifting member enables lifting of the data storage device by the slidable member when the data storage device is within the guide system. The slidable member further includes a bent latch-release portion between the top portion and the bottom portion. The bent latch-release portion biases the data storage device towards the second guide wall.

In yet another embodiment, an apparatus is provided. The apparatus includes a guide system including first and second opposing guide walls with compliant guide features extending from the first and second guide walls. The compliant guide features compress a data storage device when the data storage device is positioned between the first and the second opposing guide walls. The compliant guide features are made of a same material as the opposing guide walls. The apparatus also includes a slidable member operably coupled to the first guide wall. The slidable member includes a top portion having retention features and a bottom portion having a lifting member. The lifting member enables lifting of the data storage device by the slidable member when the data storage device is within the guide system.

Other features and benefits that characterize embodiments of the disclosure will be apparent upon reading the following detailed description and review of the associated drawings.

BRIEF DESCRIPTION OF THE DRAWINGS

FIGS. 2A-2K are diagrammatic illustrations of a data storage device insertion, retention and removal system in accordance with one embodiment.

DETAILED DESCRIPTION OF ILLUSTRATIVE EMBODIMENTS

Figure 1:
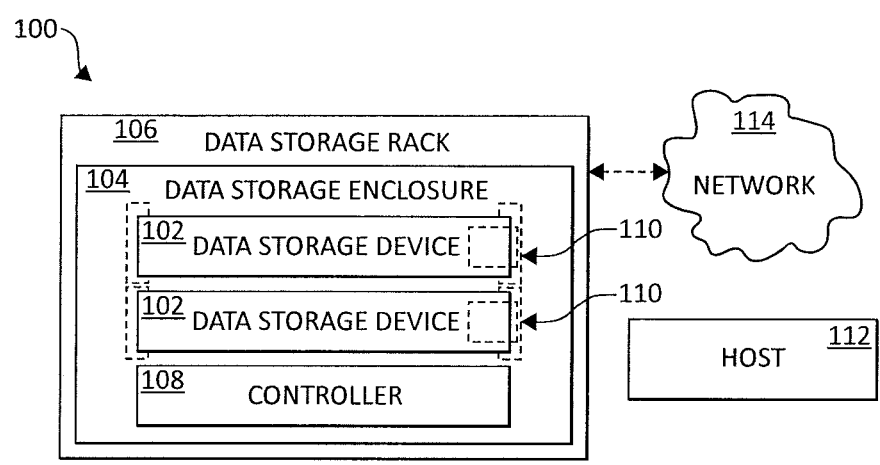
FIG. 1 is a block diagram of an example data storage system in which various embodiments of the present disclosure can be employed.

Embodiments of the disclosure are generally directed to a carrierless insertion, retention and removal system to position a data storage device in a data storage enclosure.

Recently, demand for greater data capacity has sharply increased. The advent of network data storage, such as cloud computing and remote data centers, has emphasized the assembly, installation, and use of data storage devices as part of data storage enclosures that aggregate multiple data storage devices to provide large data capacity. Examples of data storage devices include hard disc drives, solid state drives and hybrid drives.

In data storage enclosures, drives may be inserted, restrained and removed. Historically, the drives have been attached to carriers to control this process. Well-designed carriers control and ease drive installation, restrain the drive so its performance is not substantially affected by external or internal shock and vibration, and allow easy, controlled extraction of the drive. However, each carrier comes at a cost and, in a high density enclosure, carriers can add substantially to the cost of the enclosure, as there are additional integration charges to install the carriers. Further, the use of carriers may force a unique field-replaceable unit (FRU) for each drive type and carrier type. It may also forces special shipping packaging as the drive with the carrier may not fit into factory packaging.

Embodiments of the disclosure, which are described in detail further below, eliminate carriers and associated costs and FRU proliferation while still controlling the insertion, retention and removal of the drives. Embodiments of the disclosure utilize a low cost part (e.g., a low cost metal part) to carry out the insertion, retention and removal of a drive, thereby providing a substantial cost and complexity reduction for storage enclosures, especially higher density designs used in the cloud. Prior to providing additional details regarding the different embodiments, a description of an illustrative operating environment is provided below.

It should be noted that the same reference numerals are used in different figures for same or similar elements. It should be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

FIG. 1 is a block diagram of an example data storage system 100 in which various embodiments of the present disclosure can be employed. The data storage system 100 can provide large data capacity via the aggregation of at least two data storage devices 102 in a data storage enclosure 104. A data storage rack 106 can comprise any number of data storage enclosures 104 that can be individually accessed in the rack 106. It is contemplated that the data storage rack 106 is a frame, or cabinet, that provides physical support for a plurality of data storage enclosures 104.

A data storage enclosure 104 can provide physical support for a plurality of data storage devices 102 as well as electrical connections that allow a local enclosure controller 108, such as a microprocessor, to access and control the flow of data into, and out of, respective data storage devices 102. Although a data storage enclosure 104 can utilize any number of local controllers 108, the enclosure 104 is arranged to provide physical support to align the respective data storage devices 102 with electrical connectors, such as a serial bus, that interconnect with the local controller(s) 108. Such physical support can be facilitated through a carrierless insertion, retention and removal system 110 (shown in dashed lines in FIG. 1) that secures a data storage device 102 in the data storage enclosure 104. It should be noted that data storage enclosure may include additional elements (e.g., a cooling feature), which are not shown in the interest of simplification.

While a data storage rack 106, or enclosure 104, can be used in isolation, assorted embodiments provide access to a remote host 112, such as a node or server, via a wired or wireless network 114. The remote host 112 can operate in concert with, or independent of, the local enclosure controller 108 to direct data management operations. It is contemplated that particular tasks are dictated by the remote host 112 while other tasks are carried out by the local controller 108.

Figure 2B:
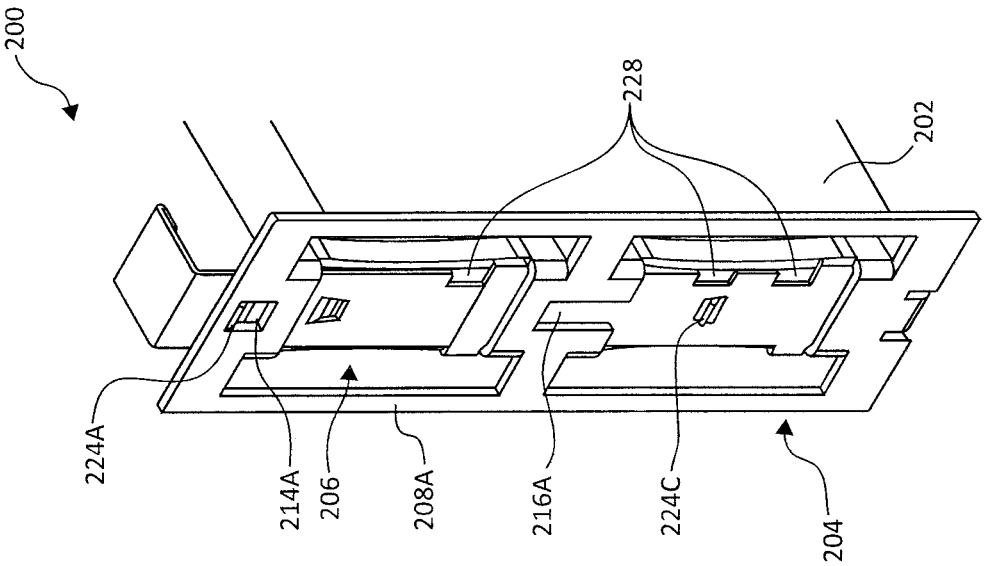
Figure 2A:
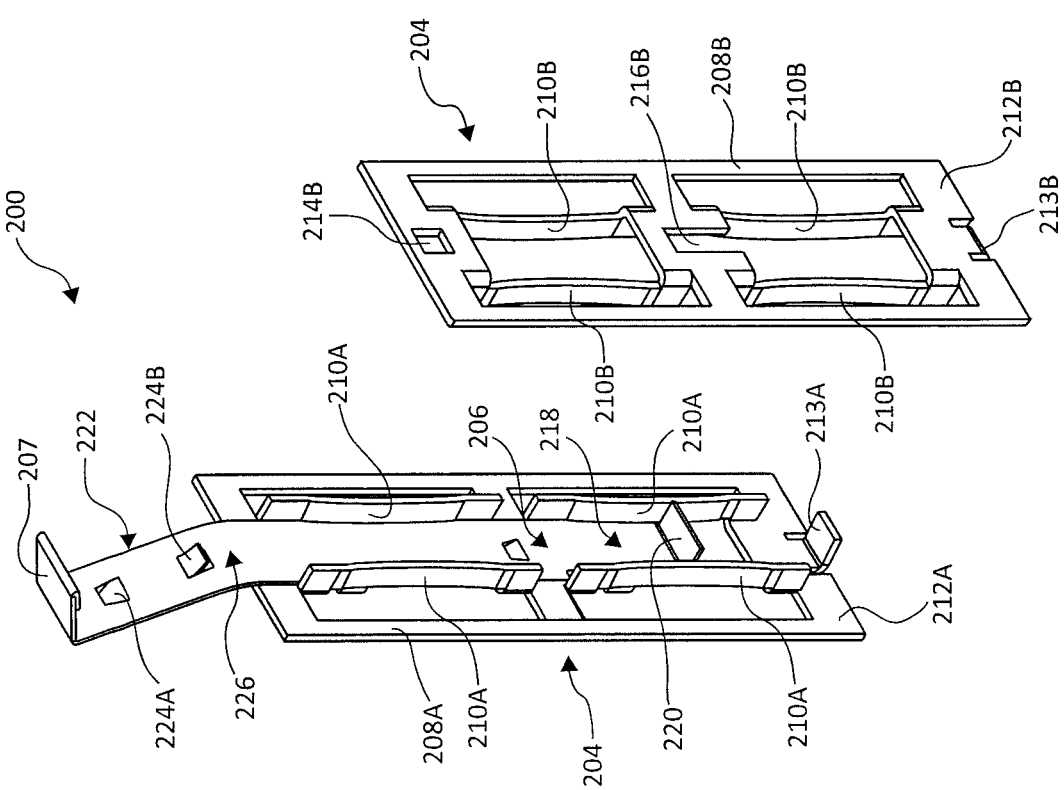

FIGS. 2A and 2B are diagrammatic illustrations of a drive insertion, retention and removal system 200 in accordance with one embodiment. The drive insertion, retention and removal system elements shown in FIG. 2A are illustratively included in insertion, retention and removal system 110 in FIG. 1. Data storage device 202 (shown in FIG. 2B) is illustratively a data storage device such as device 102 in FIG. 1.

As can be seen in FIGS. 2A and 2B, drive insertion, retention and removal system 200 includes a guide system 204, and a slidable member 206. As will be described below, data storage device 202 may be inserted, retained and removed from a data storage enclosure (such as 104 of FIG. 1) with the help of guide system 204 and slidable member 206.

In the embodiments shown in FIGS. 2A and 2B, guide system 204 includes opposing guide walls 208A and 208B with guide features 210A and 210B extending from the opposing guide walls 208A and 208B, respectively. The guide features 210A and 210B support data storage device 202 when data storage device 202 is positioned between guide walls 208A and 208B. Guide walls 208 may be attached (e.g., removably coupled) to, for example, side walls of a data storage enclosure (such as 104 of FIG. 1) using any suitable attachment technique. In some embodiments, the guide features 210A and 210B may be curved inwardly (e.g., towards the data storage device 202) to compress the data storage device 202 and thereby prevent vibration/rattling. In one example, the guide features 210A and 210B may be formed of, for example, a compliant sheet metal that is pre-bent to provide soft interference with the data storage device 202, such that the guide features 210A and 210B yield enough to allow the data storage device 202 to be pushed/forced between them, and compress the data storage device 202 to prevent vibration/rattling. It should be noted that the guide feature 210A, 210B design shown in FIG. 2A is only one example, and other guide feature 210A, 210B designs that retain the data storage device 202 and prevent it from rattling may be used in alternate embodiments. It should also be noted that any suitable compliant material other than a compliant metal sheet (e.g., a compliant plastic) may be utilized to form the guide features 210A and 21B in alternate embodiments. In some embodiments, both guide features 210A and 210B and guide walls 208A and 208B may be formed of a same material. In other embodiments, guide walls 208A and 208B may be formed of a different material than guide features 210A and 210B.

A bottom end 212A, 212B of each guide wall 208A, 208B may mount to a printed circuit board (PCB) with a mating drive connector (not shown). Each guide wall 208A, 208B also includes a stop member 213A, 213B proximate to the bottom end 212A, 212B. In some embodiments, each stop member 213A, 213B may be an upwardly angled foot. Other stop member 213A, 213B designs may be employed in alternate embodiments. Guide walls 208A and 208B may further include capture features (e.g., shaped features and/or holes 214A, 214B and 216A, 216B) that are configured to receive clips or other latching elements of slidable member 206. In one embodiment, capture feature 216A, 216B may have an inverted U shape. In alternate embodiments, capture feature 216A, 216B may have any other suitable shape. Different elements of slidable member 206 are described below.

As can be seen in FIGS. 2A and 2B, slidable member 206 is operably coupled to guide wall 208A to move between an open position (shown in FIG. 2A) and a closed position (shown in FIG. 2B). In an alternate example, slidable member 206 may instead be operably coupled to guide wall 208B. Slidable member 206 includes a bottom portion 218 that has a lifting member 220 that enables lifting of the data storage device 202 by the slidable member 218 when the data storage device 202 is within the guide system 204. In the embodiment shown in FIG. 2A, lifting member 220 is a lifting foot. However, in certain other embodiments, lifting member 220 may be a feature that utilizes a different drive feature, such as a peg in a drive side mounting hole. One such embodiment is described further below in connection with FIGS. 4A and 4B. A top portion 222 of slidable member 206 includes a handle 207 and opposing clip features 224A and 224B. Clip feature 224A is included to retain slidable member 206 in a latched position or closed position as shown in FIG. 2B. As will be described further below, clip feature 224B is utilized to capture the data storage device 202 vertically in the guide system 204 in the closed position. As can be seen in FIG. 2A, a portion 226 of slidable member 206 substantially immediately below clip feature 224B is pre-bent such that, in the open position shown in FIG. 2A, the top portion 222 is tilted away from a vertical position. This may ease removal of the data storage device 202. Also, in the closed position shown in FIG. 2B, pre-bent latch-release portion 226 of slidable member 206 provides a bow that acts as a bias mechanism to prevent the data storage device 202 from rattling. A clip feature 224C (shown in FIG. 2B) is included in a lower portion of the slidable member 206 to stop movement of the slidable member 216 beyond a full upward position. Slidable member 206 also includes a plurality of cutouts 228 (shown in FIG. 2B) that allow installation of the slidable member 206 under/behind guide features 210A or 210B. Insertion, retention and removal of data storage device 202 is described below in connection with FIGS. 2C-2K, and installation of slidable member 206 into guide system 204 is described further below in connection with FIGS. 3A-3D.

FIGS. 2C and 2D are diagrammatic illustrations showing data storage device 202 initially inserted into system 200. Here, slidable member 206 is in the open position (similar to the position shown in FIG. 2A) with the top portion 222 of the slidable member above 206 the side wall 208A. Compressive forces applied by curved guide features 210A and 210B hold the data storage device 202 in place during insertion. As can be in FIG. 2D, when the data storage device is inserted into guide system 204 and the slidable member 206 is in the open position, clip feature 224B clears (e.g., is located above) the data storage device 202.

Figures 2E, 2F, 2G:
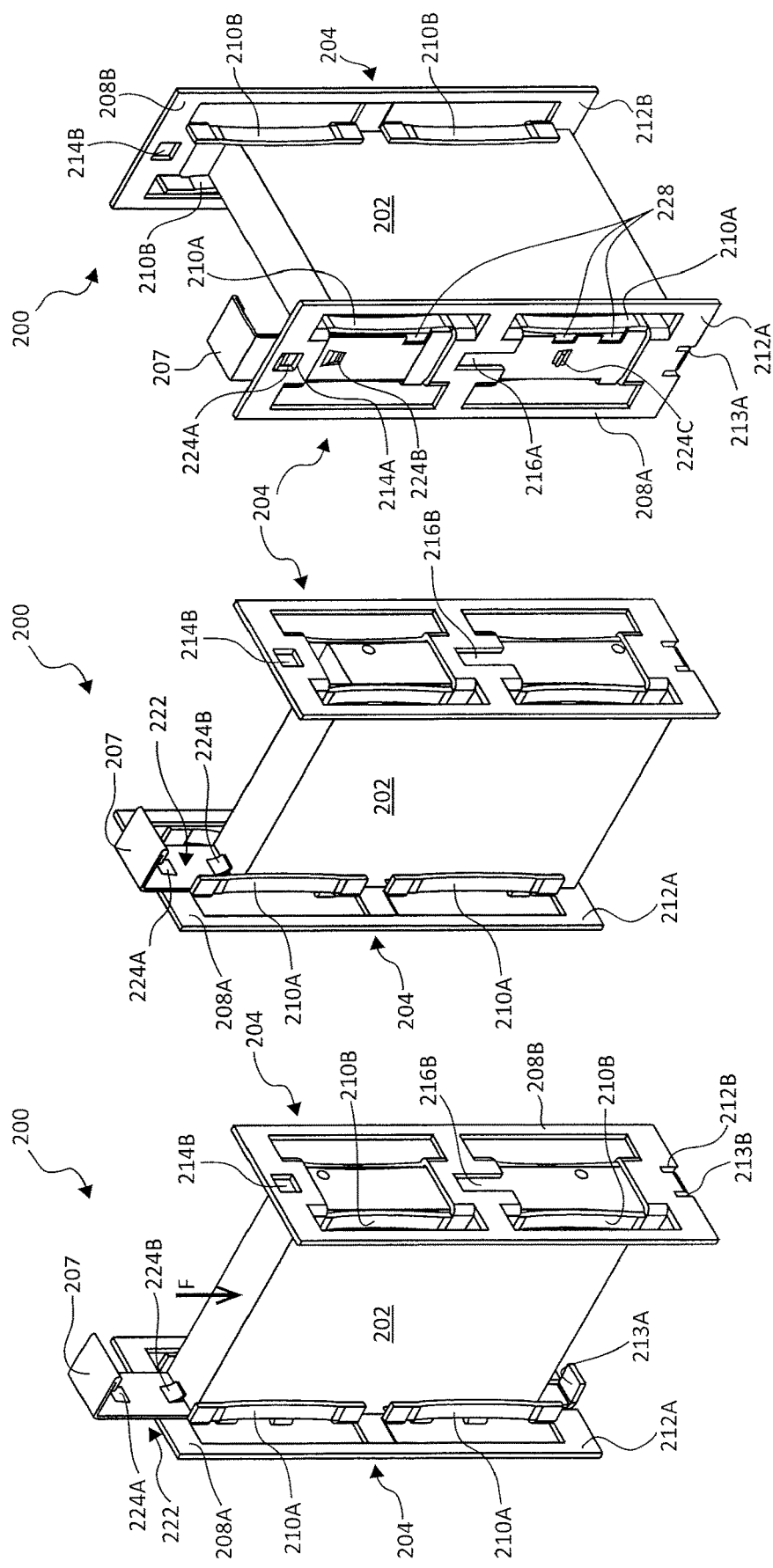

FIGS. 2E, 2F, 2G and 2H are diagrammatic illustrations that together show seating of data storage device 202 in system 200. Seating of data storage device 202 is carried out by pushing on top of the data storage device 202 (e.g., applying a force F as shown in FIG. 2E). FIG. 2E illustrates an intermediate seating position in which the data storage device 202 is clipped by feature 224B, but the slidable member 206 is not latched because clip feature 224A is still above guide wall 208A. FIGS. 2F, 2G and 2H are different views, which illustrate the data storage device 202 in a fully seated position within system 200. As can be seen in FIGS. 2F and 2G, clip feature 224A is within hole 214A in guide wall 208A, thereby latching together the slidable member 206 and the guide wall 208A. FIG. 2H shows upwardly angled stop member 213A in contact with lifting member 220 when the data storage device 202 is in the fully seated position. In this position, the slidable member 206 is under compression causing active engagement of the clip feature 224A with hole 214A. As indicated above, when the data storage device 202 is in the fully seated position, pre-bent latch-release portion 226 (not visible in FIG. 2H) of slidable member 206 provides a bow that acts as a bias mechanism to prevent the data storage device 202 from rattling.

Figure 2K:
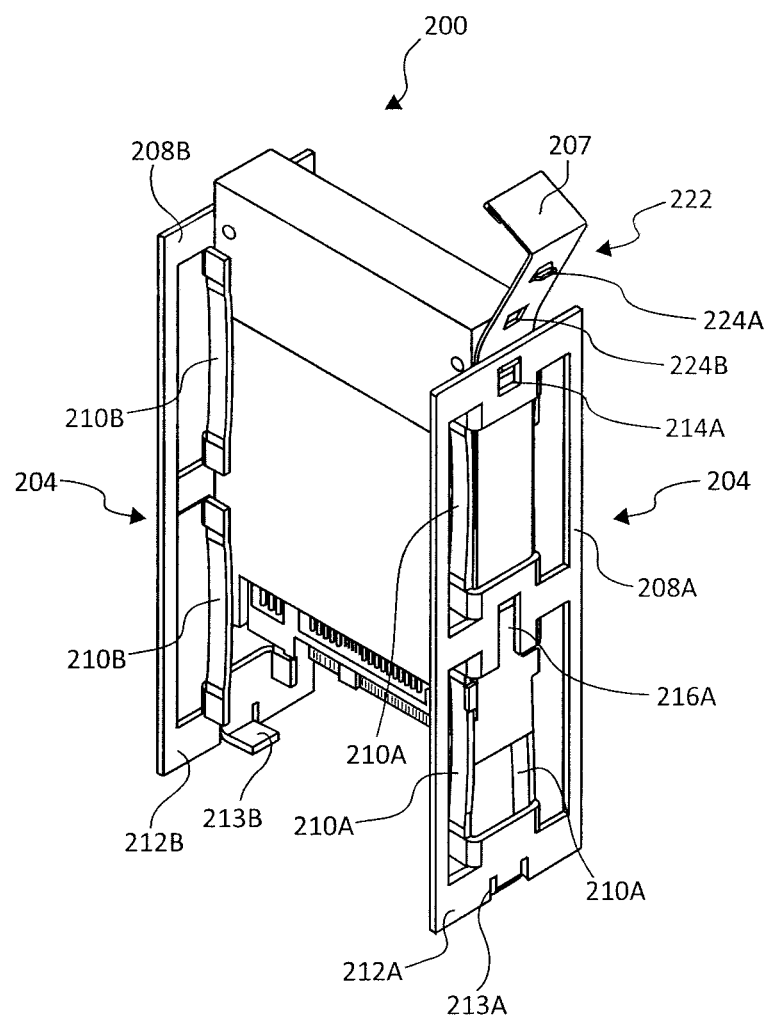

FIGS. 2I, 2J and 2K are diagrammatic illustrations that together show a procedure for removal of data storage device 202 from system 200. As can be seen in FIG. 2I, a downward force (F' in FIG. 2I) is applied on the data storage device 202 and the handle 207 is pulled towards the data storage device 202 to release the clip feature 224A from hole 214A (not visible in FIG. 2I). Once clip feature 204A is released, handle 207 is pulled upward as shown in FIG. 2J. As noted earlier, slidable member 206 may be moved upward until clip feature 224C is stopped by capture feature 216A (shown in FIG. 2A). As indicated above, this is the full upward position of the slidable member 206 in assembled system 200. After the slidable member 206 is pulled to the full upward position, the handle 207 is released. Releasing handle 207 causes it to spring back and release the data storage device 202. The released position of the data storage device 202 is shown in FIG. 2K. Once released, the data storage device 202 may be removed from system 200.

Figure 3A:
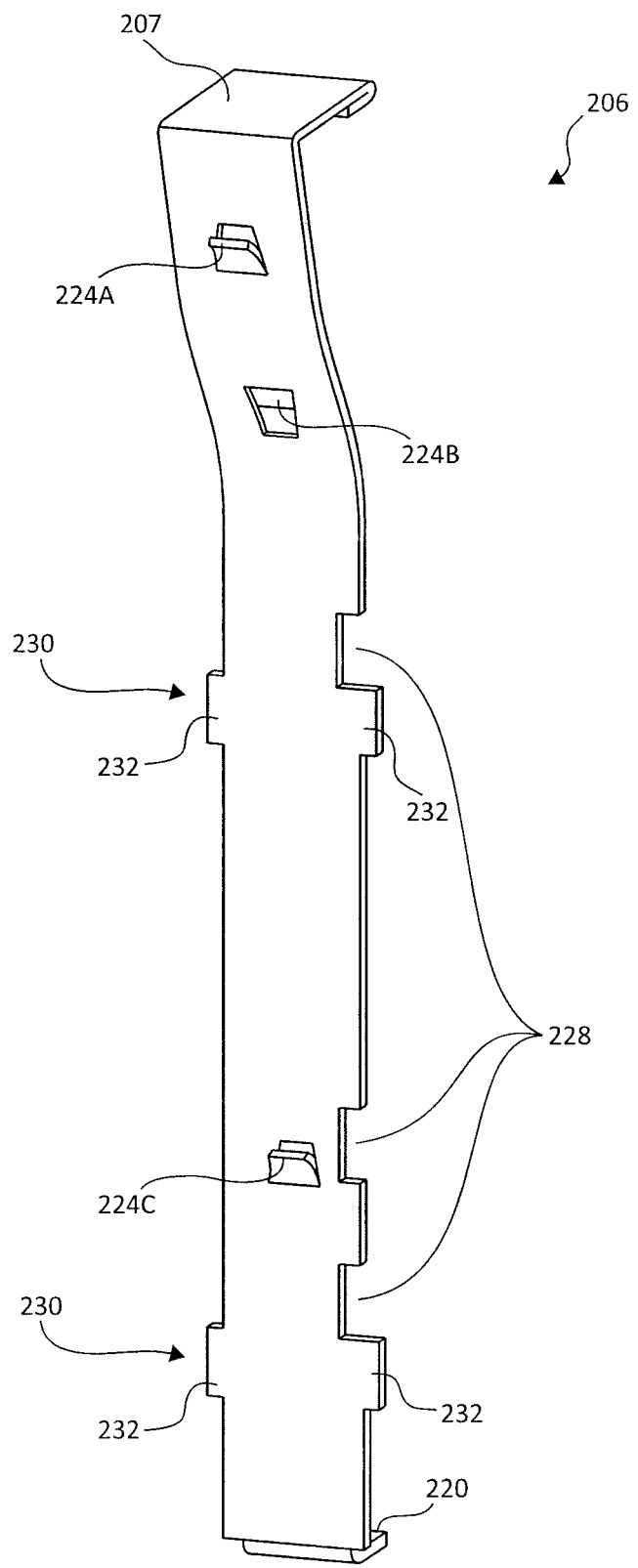
FIGS. 3A-3D are diagrammatic illustrations that together depict installation of a slidable member into a guide system in accordance with one embodiment.
Figure 3B:
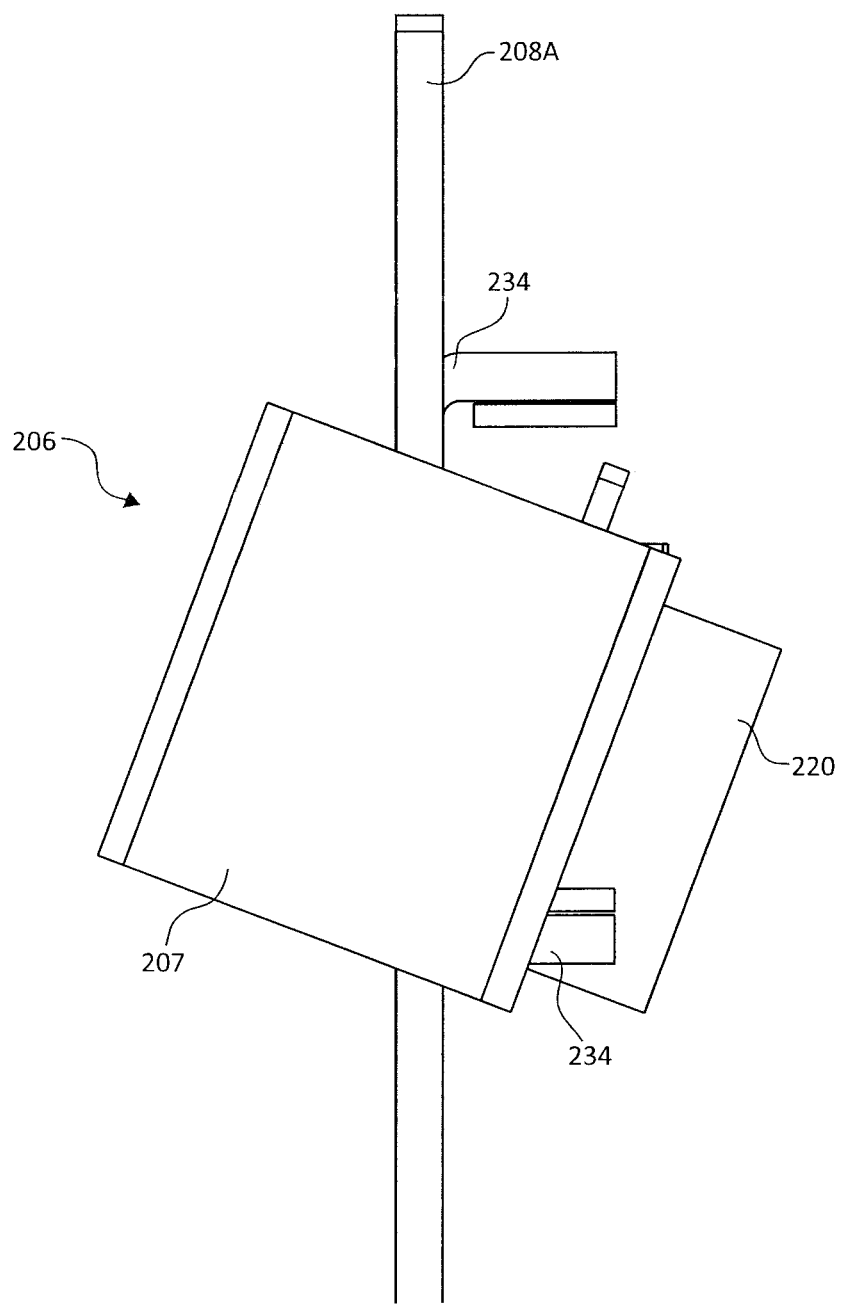
Figure 3C:
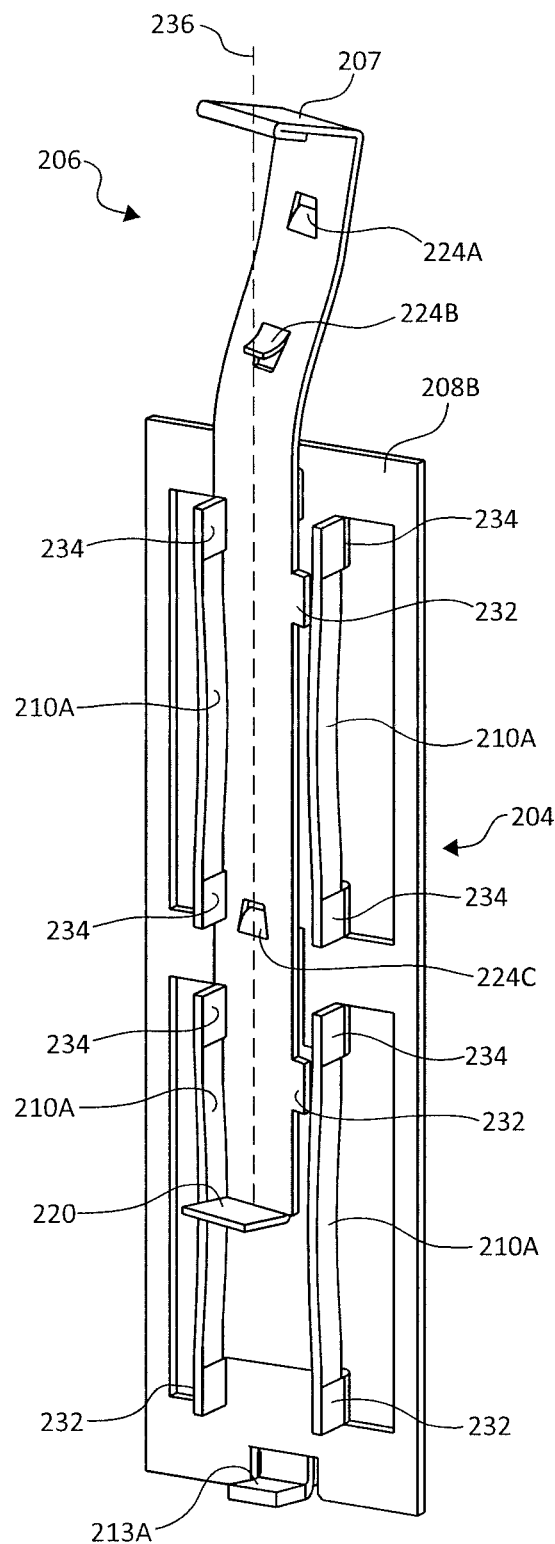
Figure 3D:
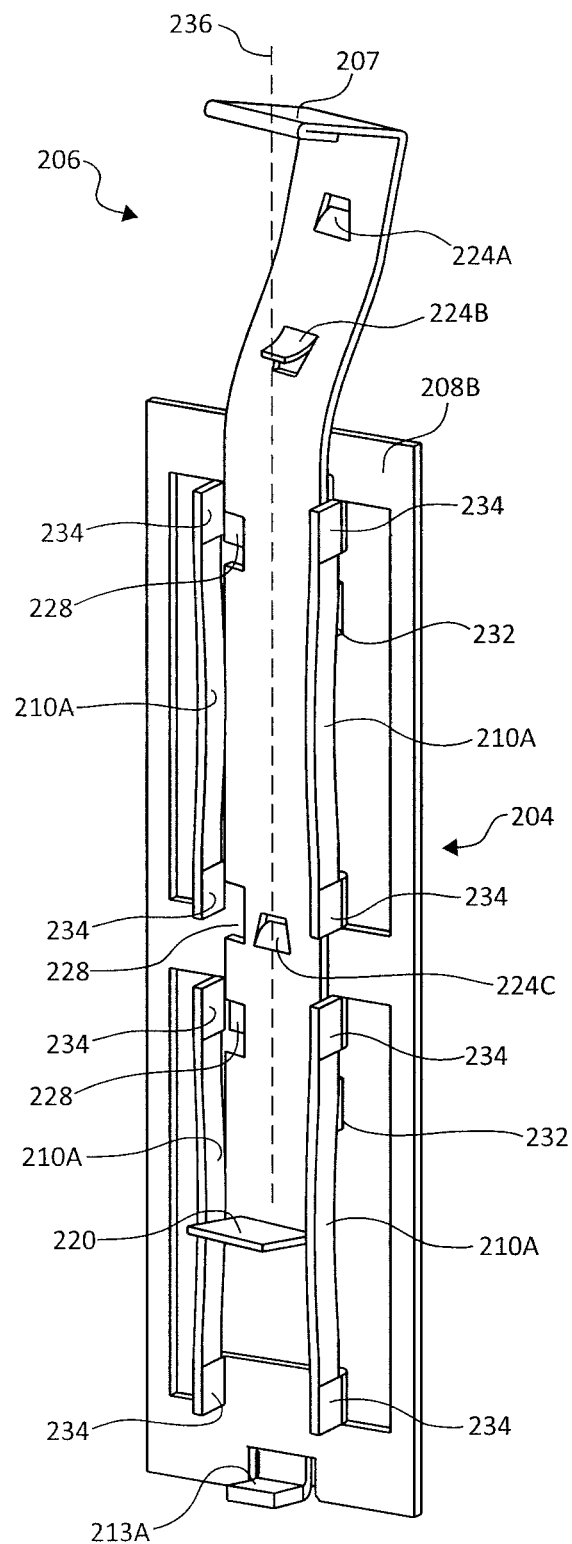

FIGS. 3A-3D are diagrammatic illustrations that together depict installation of slidable member 206 into guide system 204 in accordance with one embodiment. As can be seen in FIG. 3A, slidable member 206 includes relatively wide regions 230 with left and right side extended portions 232. Extended portions 232 of relatively wide regions 230 help hold slidable member 206 under/behind guide features 210A or 210B when slidable member 206 is installed in guide system 204. As indicated above, slidable member 206 includes cutouts 228 that allow installation of the slidable member 206 under/behind guide features 210A or 210B. As can be seen in FIG. 3B, which shows a top view of slidable member 206 and guide wall 208A, installation of slidable member 206 begins by positioning slidable member 206 at an angle relative to guide wall 208A. In the angled position of slidable member 206 relative to guide wall 208A, cutouts 228 can be relatively easily positioned such that bent features 234 that extend from guide wall 208A are within cutouts 228 as shown in FIG. 3C. In the angled position, extended portions 232 on one side (e.g., a same side as cutouts 228) of slidable member 206 are under/behind guide features 210A. From the angled position, slidable member 206 is rotated about a vertical axis 236 such that a substantially entire back portion of slidable member 206 is in contact with guide wall 208A. Then, slidable member 206 is moved sideways such that slidable member 206 is "centered" between guide features 210A with both left and right extended portions 232 of slidable member 206 being under/behind guide features 210A. This position is shown in FIG. 3D. In the slidable member 206 position shown in FIG. 3D, bent features 234 are no longer within cutouts 228 and therefore slidable member 206 may be moved up and down to enable installation of a data storage device such as 202 in a manner described above in connection with FIGS. 2A-2K.

Figure 4A:
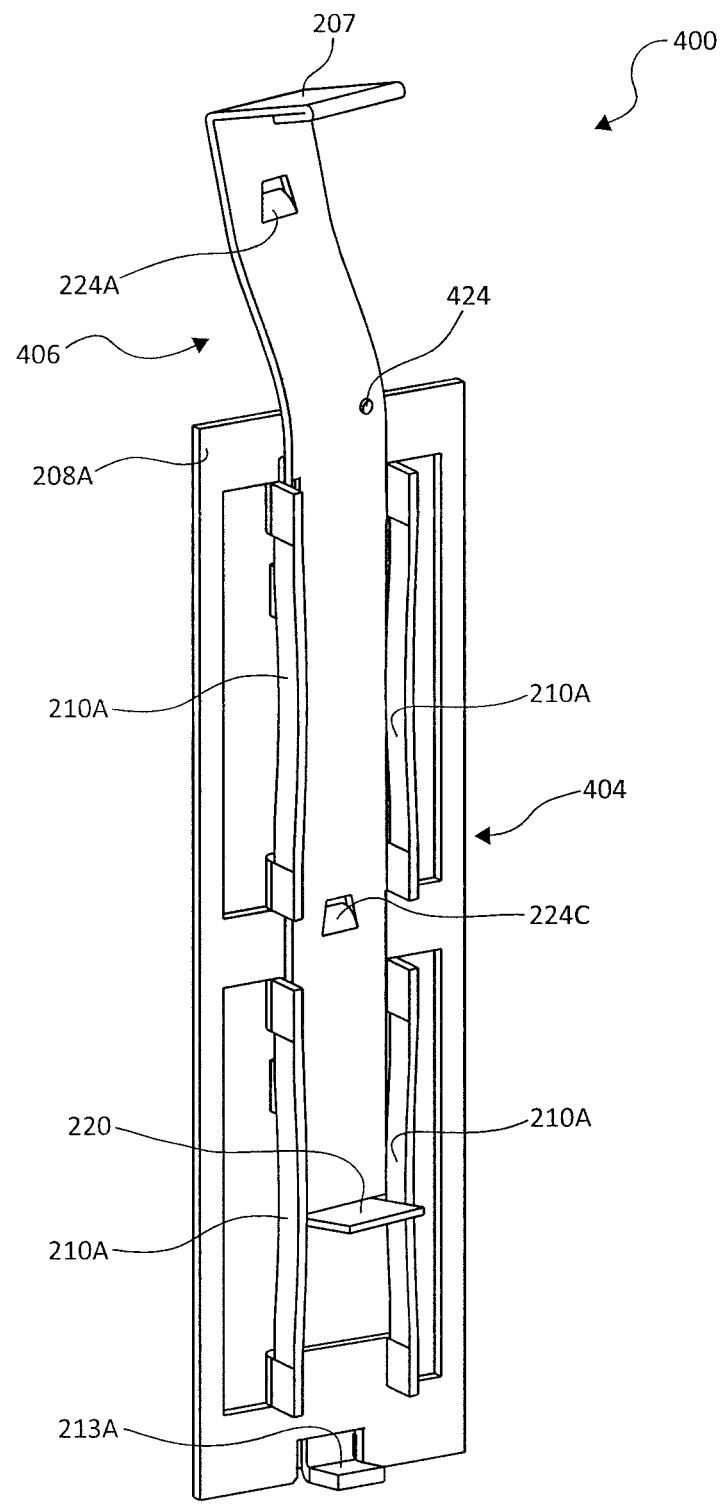
FIGS. 4A and 4B are diagrammatic illustrations of a data storage device insertion, retention and removal system in accordance with another embodiment.
Figure 4B:
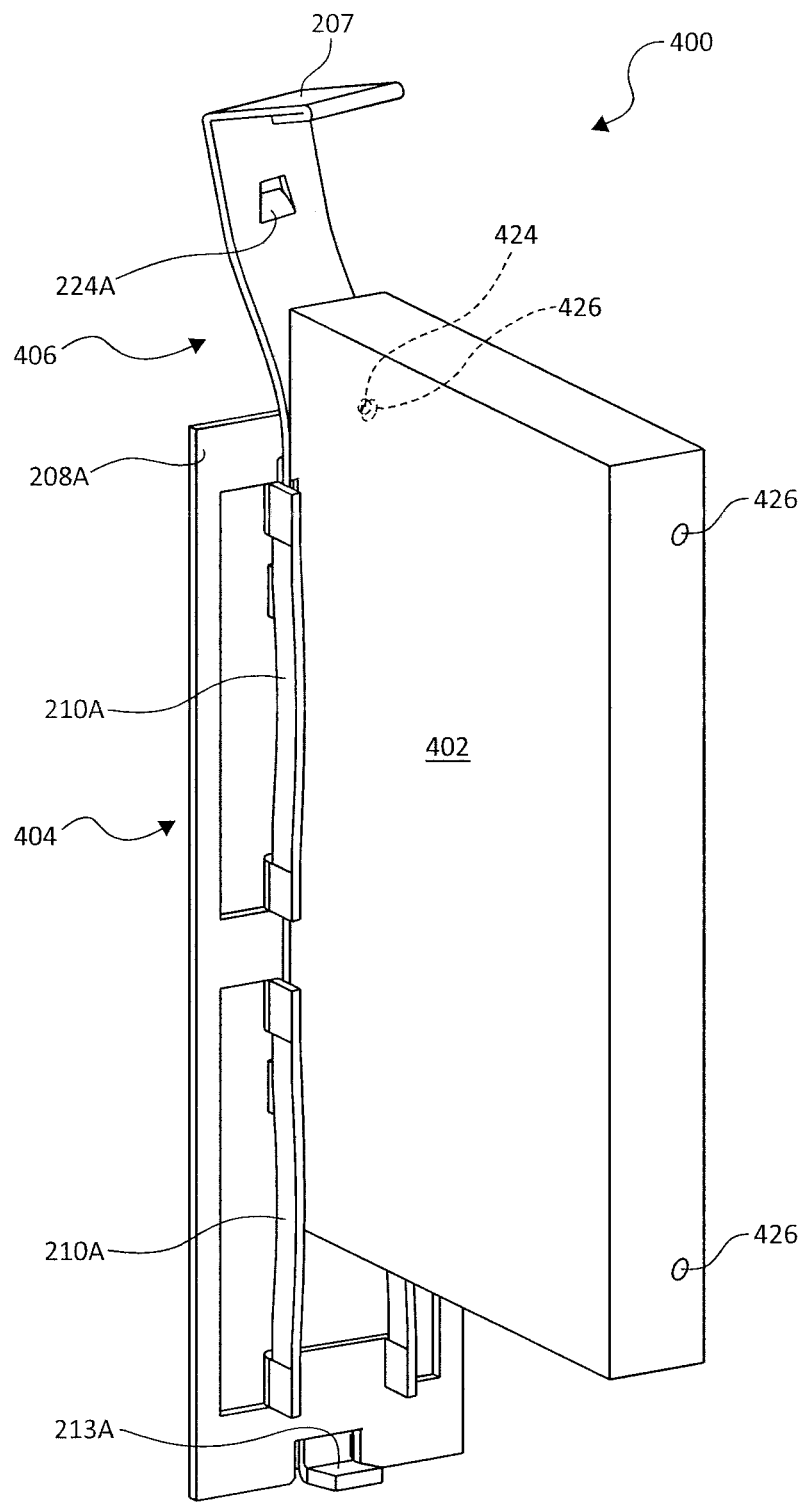

FIGS. 4A and 4B are diagrammatic illustrations of a data storage device insertion, retention and removal system 400 in accordance with another embodiment. Device insertion, retention and removal system 400 employs a guide system 404 that is substantially similar to guide system 204 of device insertion, retention and removal system 200 of FIG. 2A-2K. In the interest of simplification, only one half of guide system 404 is shown in FIGS. 4A and 4B. Also, slidable member 406 is similar to slidable member 206 of FIGS. 2A-2K. However, slidable member 406 differs from slidable member 206 of FIGS. 2A-2K in that it includes a projecting element (e.g., a peg) 424 instead of clip feature 224B employed in FIGS. 2A-2K. As can be seen in FIG. 4B, peg 424 fits into a mounting hole 426 of data storage device 402. Peg 424 performs dual functions of holding data storage device 402 in place within device insertion, retention and removal system 400 and helping provide support for lifting data storage device 402 during removal of data storage device 402 from device insertion, retention and removal system 400. Thus, in the embodiment of FIGS. 4A and 4B, lifting member 220 is optional. In general, insertion, retention and removal of data storage device 402 is similar to the insertion, retention and removal of data storage device 202 described above in connection with FIGS. 2C-2K. Also, installation of slidable member 406 into guide system 404 is similar to installation of slidable member 206 into guide system 204 described above in connection with FIGS. 3A-3D.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A data storage device insertion, retention and removal system, the system comprising:
   a guide system including first and second opposing guide walls with guide features extending from the first and second guide walls, the guide features are configured to support a data storage device when the data storage device is positioned between the first and the second opposing guide walls; and
   a slidable member operably coupled to one of the first guide wall or the second guide wall without being coupled to the other one of the first guide wall or the second guide wall, the slidable member comprising:
      a bottom portion comprising a lifting member configured to enable lifting of the data storage device by the slidable member when the data storage device is within the guide system; and
      a top portion comprising opposing clip features, with a first one of the opposing clip features configured to latch the slidable member into the first guide wall or the second glide wall when the data storage device insertion, retention and removal system is in a closed position, and a second one of the opposing clip features configured to capture the data storage device vertically within the guide system.

2. The data storage device insertion, retention and removal system of claim 1 and wherein the guide features comprise compliant bent sheet metal pieces that compress the data storage device.

3. The data storage device insertion, retention and removal system of claim 1 and wherein the slidable member further comprises a third clip feature between the top portion and the bottom portion, and wherein the third clip feature is configured to prevent upward movement of the slidable member along the first guide wall or the second guide wall when the insertion, retention and removal system is in an open position.

4. The data storage device insertion, retention and removal system of claim 3 and wherein the first guide wall and the second guide wall comprise capture features configured to receive the first opposing clip feature and the third clip feature.

5. The data storage device insertion, retention and removal system of claim 1 and wherein the first guide wall and the second guide wall comprise upwardly angled bottom stop features.

6. The data storage device insertion, retention and removal system of claim 1 and wherein the slidable member further comprises a bent latch-release portion between the top portion and the bottom portion, the bent latch-release portion is configured to bias the data storage device towards the first guide wall or second guide wall.

7. The data storage device insertion, retention and removal system of claim 1 and wherein the slidable member further comprises cutouts for installation of the slidable member into the guide system.

8. An apparatus comprising:
   a guide system including first and second opposing guide walls with guide features extending from the first and second guide walls, the guide features are configured to support a data storage device when the data storage device is positioned between the first and the second opposing guide walls; and
   a slidable member operably coupled to the first guide wall and not coupled to the second guide wall, the slidable member comprising:
      a top portion comprising retention features;
      a bottom portion comprising a lifting member configured to enable lifting of the data storage device by the slidable member when the data storage device is within the guide system; and
      a bent latch-release portion between the top portion and the bottom portion, the bent latch-release portion configured to bias the data storage device towards the second guide wall.

9. The apparatus of claim 8 and wherein the retention features comprise opposing clip features.

10. The apparatus of claim 8 and wherein the guide features comprise compliant bent sheet metal pieces that compress the data storage device.

11. The apparatus of claim 8 and wherein the first guide wall and the second guide wall comprise upwardly angled bottom stop features.

12. The apparatus of claim 8 and wherein the slidable member further comprises cutouts for installation of the slidable member into the guide system.

13. A method comprising:
inserting a data storage device into a guide system including first and second opposing guide walls with compliant guide features extending from the first and second guide walls and a slidable member operably coupled to the first guide wall and not coupled to the second guide wall, the insertion of the data storage device being carried out when the slidable member in in an open position, and the compliant guide features compressing the data storage device when the data storage device is positioned between the first and the second opposing guide walls; and
once the data storage device in fully inserted into the guide system, latching together the slidable member and the first guide wall by a first clip feature in a top portion of the slidable member, and holding the data storage device within the guide system by a second clip feature of the slidable member, the second clip feature being below the first clip feature.

14. The method of claim 13 and wherein the opposing guide walls and the compliant guide features are formed of a same material.

15. The method of claim 13 and further comprising biasing the data storage device towards the second guide wall by a bent latch-release portion between the top portion of the slidable member and a bottom portion of the slidable member.

16. The method of claim 13 and wherein a first surface of the data storage device is in contact with a lifting member in a bottom portion of the slidable member when the data storage device in fully inserted into the guide system.

17. The method of claim 16 and further comprising removing the data storage device from the guide system by:
applying a substantially perpendicular force to a second surface of the data storage device that is opposite to the first surface of the data storage device, and thereby releasing the first clip feature for the first guide wall.

18. The method of claim 17 and further comprising, once the first clip feature is released from the first guide wall, pulling a handle in the top portion of the slidable member such that the data storage device is lifted by the lifting member.

19. The method of claim 18 and further comprising releasing the handle when the slidable member reaches a full upward position.

20. The method of claim 19 and further comprising removing the data storage device from the guide system after the handle is released.

\* \* \* \* \*